No. 670,077. Patented Mar. 19, 1901.
G. HOPP.
GREENHOUSE ROOF.
(Application filed June 27, 1900.)
(No Model.)
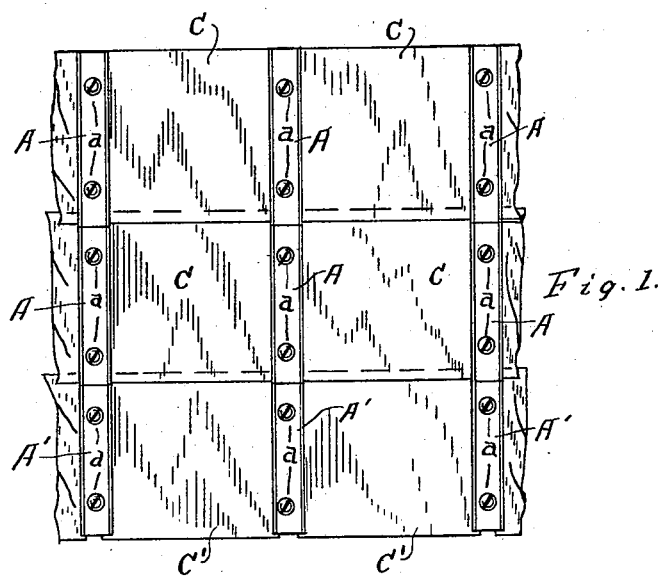
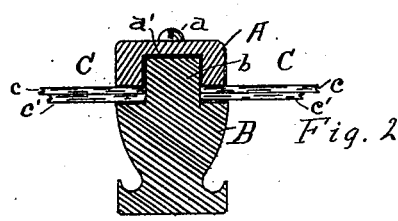
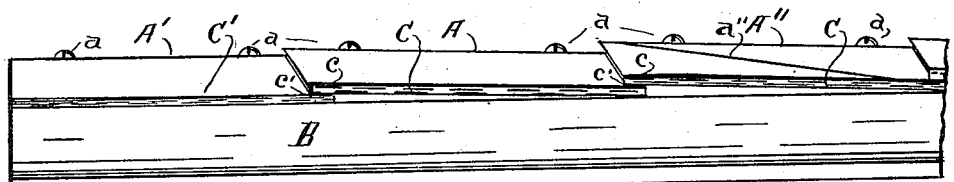
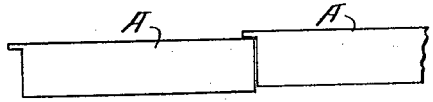
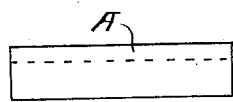
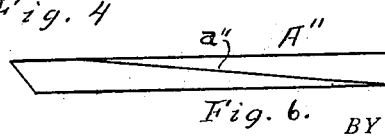
WITNESSES:
INVENTOR.
George Hopp
BY
Ithiel J. Cilley
ATTORNEY.
THE NORRIS PETERS CO., PHOTO-LITHO., WASHINGTON, D. C.

UNITED STATES PATENT OFFICE.

GEORGE HOPP, OF GRAND RAPIDS, MICHIGAN.

GREENHOUSE-ROOF.

SPECIFICATION forming part of Letters Patent No. 670,077, dated March 19, 1901.

Application filed June 27, 1900. Serial No. 21,840. (No model.)

*To all whom it may concern:*

Be it known that I, GEORGE HOPP, a citizen of the United States, residing at Grand Rapids, in the county of Kent and State of Michigan, have invented certain new and useful Improvements in Greenhouse-Roofs, of which the following is a specification.

My invention relates to improvements in the manner of securing glass in the roofs of greenhouses; and its objects are, first, to provide a means whereby the adjacent edges of the panes of glass may be overlapped and the laying of each pane or row of panes will fix the gage for the laying of the next succeeding pane or row of panes, and, second, to provide a fastening for greenhouse-roofs that may be readily removed and any one pane of glass may be removed or replaced without disturbing other panes. I attain these objects by the mechanism illustrated in the accompanying drawings, in which—

Figure 1 is a plan of a section of roof, showing the manner of securing the glass. Fig. 2 is a sectional end view of a mullion, showing the ends of the glass and the retaining-pieces in place. Fig. 3 is a side view of the mullion, showing the glass overlapped at the ends and the manner of applying the retaining-pieces. Fig. 4 shows a modified form of lap between the ends of the retaining-pieces. Fig. 5 is a square-ended retaining-piece, and Fig. 6 shows an extensible retaining-piece.

Similar letters refer to similar parts throughout the several views.

My fastening consists of a cap A, which is provided with a groove $a'$ of proper size and form to fit over the parting-lip $b$ of the mullion B, and when secured to place by the retaining-screws $a$ their lower edges will be made to bear firmly on the surface of the glass, as shown in Figs. 2 and 3. The screws $a$ pass through the retaining-pieces A and screw into the mullion beneath.

In Figs. 1 and 3 the retaining-piece A' and the glass C' represent those at the lower edge of the roof or, more properly speaking, at the eaves, and A and C represent, respectively, the retaining pieces or caps and the successive layers of glass as they approach the upper or ridge line of the roof. It will be readily noticed that the glass C' lies flat upon its bearing upon the mullion, while those shown at C have one edge resting upon the edge of the next preceding glass and the other edge under the next succeeding glass, thus forming a perfect lap for the free flow of water without danger of leaking, as in the use of abutting joints in common use upon greenhouse-roofs.

In laying the roof with my retaining-pieces when the first row of glass C' has been placed and the retaining-pieces screwed to place the upper ends of these pieces form a gage against which to place the end of the next succeeding pane or panes of glass, and thus renders the laying of the roof a very simple and complete process, averting entirely the necessity of employing skilled labor for constructing these roofs.

If it is desired to remove any one or more panes of glass, all that is necessary is to draw the screws and remove the caps that retain the glass to be moved without touching or affecting those retaining other panes of glass.

The retaining-pieces may be used with square ends, as in Fig. 5; but I greatly prefer a bevel-joint, as in Fig. 3, or a lap-joint, as in Fig. 4, as with either of these, the lap being down or toward the eaves of the roof, water is much less liable to percolate through the joint and leak into the house or rot the ends of the retaining-pieces.

The reference-letter $c$ represents the overlapping edge of the glass, and the letter $c'$ represents the underlapping edge.

With a roof constructed as herein described it not only enables me to overlap the adjoining edges of the glass, but the retaining-pieces, when properly secured to place, form practically water-tight joints upon the surface of the glass, thus forming a perfect gutter for the full free flow of the water.

As it is sometimes difficult to cut the retaining-pieces to the exact desired length, so that all layers of glass will exactly correspond, and especially so with the last layer next to the ridge of the roof, I find it necessary to provide for shortening or lengthening the pieces, and for this purpose I find the most available way is to split them so as to form a long lap-splice, as shown at $a''$, upon the piece A'', in Figs. 3 and 6, which enables me to vary the length to a considerable extent, as indicated by the dotted lines in Fig. 6.

Having thus fully described my invention, what I claim as new, and desire to secure by Letters Patent of the United States, is—

1. In combination with the mullions and overlapping glass of a greenhouse-roof, grooved retaining-pieces secured to the mullions over each pane of glass and having the ends beveled to form overlapping joints, substantially as and for the purpose set forth.

2. In combination with the mullions and glass of a greenhouse-roof, separate retaining-strips for each glass or layer of glass, said pieces made extensible by overlapping wedge-shaped sections, substantially as and for the purpose set forth.

Signed at Grand Rapids, Michigan, June 22, 1900.

GEORGE HOPP.

In presence of—
W. B. COMSTOCK,
I. J. CILLEY.